(12) United States Patent
Todhunter et al.

(10) Patent No.: US 9,009,590 B2
(45) Date of Patent: Apr. 14, 2015

(54) SEMANTIC PROCESSOR FOR RECOGNITION OF CAUSE-EFFECT RELATIONS IN NATURAL LANGUAGE DOCUMENTS

(75) Inventors: James Todhunter, Framingham, MA (US); Igor Sovpel, Minsk (BY); Dzianis Pastanohau, Minsk (BY); Alexander Vorontsov, Minsk (BY)

(73) Assignee: Invention Machines Corporation, Boston, MA (US)

( * ) Notice: Subject to any disclaimer, the term of this patent is extended or adjusted under 35 U.S.C. 154(b) by 2081 days.

(21) Appl. No.: 11/258,250

(22) Filed: Oct. 24, 2005

(65) Prior Publication Data

US 2006/0041424 A1  Feb. 23, 2006

Related U.S. Application Data

(63) Continuation-in-part of application No. 10/208,941, filed on Jul. 31, 2002, now Pat. No. 7,251,781.

(60) Provisional application No. 60/308,886, filed on Jul. 31, 2001.

(51) Int. Cl.
*G06F 17/00* (2006.01)
*G06F 17/27* (2006.01)
*G06F 17/30* (2006.01)

(52) U.S. Cl.
CPC ...... *G06F 17/2785* (2013.01); *G06F 17/30719* (2013.01)

(58) Field of Classification Search
CPC .............................. G06F 17/2785; G06F 17/21

USPC ......................................................... 715/256
See application file for complete search history.

(56) References Cited

U.S. PATENT DOCUMENTS

| 4,829,423 A | 5/1989 | Tennant et al. |
| 4,864,502 A | 9/1989 | Kucera et al. |
| 4,868,750 A | 9/1989 | Kucera et al. |

(Continued)

FOREIGN PATENT DOCUMENTS

| CN | 101702944 A | 5/2010 |
| EP | 1793318 A2 | 6/2007 |

(Continued)

OTHER PUBLICATIONS

Engelson, et al., "A Memory-Based Approach to Learning Shallow Natural Language Patterns", Bar-Ilan University, Israel, May 23, 1999, p. 1-28.*

(Continued)

*Primary Examiner* — Amelia Tapp
(74) *Attorney, Agent, or Firm* — Faegre Baker Daniels LLP

(57) ABSTRACT

A Semantic Processor for the recognition of Cause-Effect relations in natural language documents which includes a Text Preformatter, a Linguistic Analyzer and a Cause-Effect Knowledge Base Generator. The Semantic Processor provides automatic recognition of cause-effect relation both inside single fact and between the facts in arbitrary text documents, where the facts are also automatically extracted from the text in the form of seven-field semantic units. The recognition of Cause-Effect relations is carried out on the basis of linguistic (including semantic) text analysis and a number of recognizing linguistic models built in the form of patterns.

23 Claims, 4 Drawing Sheets

(56) References Cited

U.S. PATENT DOCUMENTS

| | | | |
|---|---|---|---|
| 4,887,212 A | | 12/1989 | Zamora et al. |
| 5,060,155 A | | 10/1991 | Van Zuijlen |
| 5,146,405 A | * | 9/1992 | Church ............................ 704/9 |
| 5,331,556 A | * | 7/1994 | Black et al. ....................... 704/9 |
| 5,369,575 A | | 11/1994 | Lamberti et al. |
| 5,377,103 A | | 12/1994 | Lamberti et al. |
| 5,404,295 A | | 4/1995 | Katz et al. |
| 5,418,889 A | | 5/1995 | Ito |
| 5,424,947 A | | 6/1995 | Nagao et al. |
| 5,485,372 A | * | 1/1996 | Golding et al. ................... 704/9 |
| 5,559,940 A | | 9/1996 | Hutson |
| 5,614,899 A | | 3/1997 | Tokuda et al. |
| 5,638,543 A | | 6/1997 | Pedersen et al. |
| 5,694,592 A | | 12/1997 | Driscoll |
| 5,696,916 A | | 12/1997 | Yamazaki et al. |
| 5,708,825 A | | 1/1998 | Sotomayor |
| 5,715,468 A | | 2/1998 | Budzinski |
| 5,724,571 A | | 3/1998 | Woods |
| 5,748,973 A | | 5/1998 | Palmer et al. |
| 5,761,497 A | | 6/1998 | Holt et al. |
| 5,774,845 A | | 6/1998 | Ando et al. |
| 5,794,050 A | | 8/1998 | Dahlgren et al. |
| 5,799,268 A | | 8/1998 | Boguraev |
| 5,802,504 A | | 9/1998 | Suda et al. |
| 5,844,798 A | | 12/1998 | Uramoto |
| 5,873,056 A | | 2/1999 | Liddy et al. |
| 5,873,076 A | | 2/1999 | Barr et al. |
| 5,878,385 A | | 3/1999 | Bralich et al. |
| 5,924,108 A | | 7/1999 | Fein et al. |
| 5,933,822 A | * | 8/1999 | Braden-Harder et al. ......... 707/5 |
| 5,963,940 A | | 10/1999 | Liddy et al. |
| 5,966,686 A | | 10/1999 | Heidorn et al. |
| 5,978,820 A | | 11/1999 | Mase et al. |
| 6,026,388 A | | 2/2000 | Liddy et al. |
| 6,056,428 A | | 5/2000 | Devoino et al. |
| 6,076,051 A | | 6/2000 | Messerly et al. |
| 6,076,088 A | * | 6/2000 | Paik et al. ............................ 1/1 |
| 6,128,634 A | | 10/2000 | Golovchinsky et al. |
| 6,167,370 A | | 12/2000 | Tsourikov et al. |
| 6,185,592 B1 | | 2/2001 | Boguraev et al. |
| 6,202,043 B1 | | 3/2001 | Devoino et al. |
| 6,205,456 B1 | | 3/2001 | Nakao |
| 6,212,494 B1 | | 4/2001 | Boguraev |
| 6,246,977 B1 | | 6/2001 | Messerly et al. |
| 6,263,335 B1 | | 7/2001 | Paik et al. |
| 6,317,708 B1 | | 11/2001 | Witbrock et al. |
| 6,338,034 B1 | | 1/2002 | Ishikawa |
| 6,349,316 B2 | | 2/2002 | Fein et al. |
| 6,374,209 B1 | | 4/2002 | Yoshimi et al. |
| 6,381,598 B1 | | 4/2002 | Williamowski et al. |
| 6,401,086 B1 | | 6/2002 | Bruckner |
| 6,424,362 B1 | | 7/2002 | Bornstein et al. |
| 6,442,566 B1 | | 8/2002 | Atman et al. |
| 6,459,949 B1 | | 10/2002 | Black et al. |
| 6,505,157 B1 | * | 1/2003 | Elworthy ....................... 704/257 |
| 6,537,325 B1 | | 3/2003 | Nishizawa |
| 6,557,011 B1 | | 4/2003 | Sevitsky et al. |
| 6,701,345 B1 | | 3/2004 | Carley et al. |
| 6,754,654 B1 | | 6/2004 | Shah et al. |
| 6,789,230 B2 | | 9/2004 | Katariya et al. |
| 6,823,325 B1 | | 11/2004 | Davies et al. |
| 6,823,331 B1 | | 11/2004 | Abu-Hakima |
| 6,871,199 B1 | | 3/2005 | Binnig et al. |
| 7,035,877 B2 | | 4/2006 | Markham et al. |
| 7,120,574 B2 | | 10/2006 | Troyanova et al. |
| 7,251,781 B2 | | 7/2007 | Batchilo et al. |
| 2001/0014852 A1 | | 8/2001 | Tsourikov et al. |
| 2001/0049688 A1 | | 12/2001 | Fratkina et al. |
| 2002/0010574 A1 | | 1/2002 | Tsourikov et al. |
| 2002/0103793 A1 | | 8/2002 | Koller et al. |
| 2002/0116176 A1 | | 8/2002 | Tsourikov et al. |
| 2002/0169598 A1 | | 11/2002 | Minker |
| 2002/0184206 A1 | | 12/2002 | Evans |
| 2003/0130837 A1 | | 7/2003 | Batchilo et al. |
| 2004/0001099 A1 | | 1/2004 | Reynar et al. |
| 2004/0261021 A1 | 12/2004 | Mittal et al. |
| 2005/0055385 A1 | 3/2005 | Sinha et al. |
| 2005/0114282 A1 | 5/2005 | Todhunter |
| 2005/0131874 A1 | 6/2005 | Verbitsky |
| 2006/0041424 A1 | 2/2006 | Todhunter et al. |
| 2006/0167931 A1 | 7/2006 | Bobick et al. |
| 2006/0242195 A1 | 10/2006 | Bove et al. |
| 2007/0006177 A1 | 1/2007 | Aiber et al. |
| 2007/0050393 A1 | 3/2007 | Vogel et al. |
| 2007/0094006 A1 | 4/2007 | Todhunter et al. |
| 2007/0156393 A1 | 7/2007 | Todhunter et al. |
| 2008/0294637 A1 | 11/2008 | Liu |
| 2008/0319735 A1 | 12/2008 | Kambhatla et al. |

FOREIGN PATENT DOCUMENTS

| | | |
|---|---|---|
| EP | 2135175 A1 | 12/2009 |
| JP | 4467184 B2 | 5/2010 |
| KR | 20090130854 A | 12/2009 |
| WO | 0014651 A1 | 3/2000 |
| WO | 2007051106 A2 | 5/2007 |
| WO | 2008113065 A1 | 9/2008 |
| WO | 2009016631 A2 | 2/2009 |

OTHER PUBLICATIONS

Brill, "Transformation-Based Error-Driven Learning and Natural Language Processing: A Case Study in Part-of-Speech Tagging", copyright 1995, Association for Computational Linguistics, Computational Linguistics, vol. 21, No. 4, p. 543-565.*

Brill, "Some Advances in Transformation-Based Part of Speech Tagging", Jun. 1994, p. 1-6.*

Katz et al., "REXTOR: A System for Generating Relations from Natural Language", In Proceedings of the ACL 2000Workshop on Natural Language Processing and Information Retrieval, Oct. 2000, p. 1-11.*

Khoo, Christopher S.G., et al., "Automatic Extraction of Cause-Effect Information from Newspaper Text Without Knowledge-Based Inferencing", XP-002427013, Literary and Linguistic Computing, vol. 13, No. 4, 1998,. pp. 177-186.

Radev, D.R., et al., "Ranking Suspected Answers to Natural Language Question Using Predictive Annotation", Proceedings of the 6th Applied Natural Language Processing Conference, Apr. 29-May 4, 2000, pp. 150-157.

Srihari, R., et al., "A Question Answering System Supported by Information Extraction", Proceedings of the 6th Applied Natural Language Processing Conference, Apr. 29-May 4, 2000, pp. 166-172.

Cardie, C., et al., "Examining the Role of Statistical and Linguistic Knowledge Sources in a General-Knowledge Question-Answering System", Proceedings of the 6th Applied Natural Language Processing Conference, Apr. 29-May 4, 2000, pp. 180-187.

Abney, S., et al., "Answer Extraction", Proceedings of the 6th Applied Natural Language Processing Conference, Apr. 29-May 4, 2000, pp. 296-301.

Volk, Martin, et al., "Semantic Annotation for Concept-Based Cross-Language Medical Information Retrieval", International Journal of Medical Informatics 67 (2002), pp. 97-112.

Feng, L., et al., "Beyond information searching and browsing: acquiring knowledge from digital libraries", Information Processing and Management, 41 (2005), pp. 97-120.

Khoo, Christopher S.G., et al., "Extracting Causal Knowledge from a Medical Database Using Graphical Patterns", 2000, Association for Computational Linguistics, Proceedings of the 38th Annual Meeting on Association for Computational Linguistics, Hong Kong, XP002427019, pp. 336-343.

Girju, Roxana, "Automatic Detection of Causal Relations for Questioning Answering", 2003, Association for Computational Linguistics, Proceedings of the ACL 2003 Workshop on Multilingual Summarization and Question Answering, XP002427020, pp. 77-80.

Chan, Ki, et al., "Extracting Causation Knowledge from Natural Language Texts", May 2002, Springer-Verlag, Proceedings of the 6th

(56) References Cited

OTHER PUBLICATIONS

Pacific-Asia Conference on Advances in Knowledge Discovery and Data Mining, Lecture Notes in Computer Science 2336, XP002427021, pp. 555-560.
Chang, Du-Seong, et al., "Causal Relation Extraction Using Cue Phrase and Lexical Pair Probabilities", Jan. 25, 2005, Springer Berlin/Heidelberg, Lecture Notes in Computer Science 3248, XP002427022, pp. 61-70.
Neumann, Gunter, et al., "A Cross-Language Question/Answering-System for German and English", Aug. 21-22, 2003, Norway, Cross Language Evaluation Forum, Proceedings following the 7th European Conference on Digital Libraries (ECDL 2003), XP002427856.
Paice, Christopher, et al., "The Use of Causal Expressions for Abstracting and Question Answering", Sep. 21-23, 2005, Bulgaria, Proceedings of the International Conference RANLP 2005 (Recent Advances in Natural Language Processing), XP002427857.
Amaral, Carlos, et al., "Design and Implementation of a Semantic Search Engine for Portuguese", May 26-28, 2004, Portugal, Proceedings of the 4th International Conference on Language Resources and Evaluation, XP002427855.
Ball, G. et al., "Lifelike Computer Characters: The Persona Project at Microsoft Research," Software Agents, AAAI Press/The MIT Press, 1997, Chapter 10.
Extended European Search Report dated Apr. 1, 2011, issued in corresponding European Application No. 08732326.7.
Extended European Search Report dated Jul. 18, 2012, issued in corresponding European Application No. 10751508.
Extended European Search Report dated Jul. 20, 2012, issued in correseponding European Application No. 10751510.
International Search Report dated Oct. 13, 2010, issued in corresponding International Application No. PCT/US2010/027221.
International Search Report dated Sep. 29, 2010, issued in corresponding International Application No. PCT/US2010/027218.
Davidov et al., "Classification of Semantic Relationships between Nominals Using Pattern Clusters," In. Proc. of ACL-08-HTL, Columbus, Ohio, USA, pp. 227-235, Jun. 30, 2008.
Girju, et al., "Automatic Discovery of Part-Whole Relations," Association for Computational Linguistics, Mar. 2006, pp. 83-135, vol. 32, No. 1, MIT Press, Cambridge, MA, USA.
Goldstein et al., "Summarizing Text Documents: Sentence Selection and Evaluation Metrics," Proceedings of the 22nd annual international ACM SIGIR conference on Research and development in information retrieval, 1999, pp. 121-128.
International Search Report dated Jul. 30, 2008, issued in corresponding International Application No. PCT/US2008/057183.
International Search Report dated Nov. 17, 1999, issued in corresponding International Application No. PCT/US1999/19699.
Kupiec, Julian et al., "A Trainable Document Summarizer," ACM Press Proceeding of the 18th Annual International ACM SIGIR Conference on Research and Development in Information Retrieval, pp. 68-73, 1995.
Reicken, D., Software Agents, AAAI Press/The MIT Press, 1997, Chapter 12, "The M System".
Tapanainen, P. et al., "A non-projective dependency parser," Fifth Conference on Applied Natural Language Processing, Mar. 31, 1997-Apr. 3, 1997, Association for Computational Linguistics, pp. 64-71.
U.S. Appl. No. 12/723,472, filed Mar. 12, 2010, 720 pages.

\* cited by examiner

SEMANTIC PROCESSOR FOR RECOGNITION OF CAUSE-EFFECT RELATIONS IN NATURAL LANGUAGE DOCUMENTS

RELATED APPLICATIONS

The present application is a continuation-in-part application of U.S. patent application Ser. No. 10/208,941, filed Jul. 31, 2002 now U.S. Pat. No. 7,251,781, titled "Computer Based Summarization of Natural Language Documents," (published as U.S. patent application Pub. No. 20030130837 on Jul. 10, 2003, which claims priority to U.S. Provisional Application Ser. No. 60/308,886, titled "Computer Based Summarization of Natural Language Documents, filed Jul. 31, 2001. The present application also claims priority to U.S. Provisional Application Ser. No. 60/308,886 based on the priority claim to U.S. patent application Ser. No. 10/208,941. These applications are incorporated herein by reference in their entirety.

The present application, while not claiming priority to, may be related to the following United States patent applications: U.S. patent application Ser. No. 09/815,260, filed Mar. 22, 2002 (U.S. patent application Pub. No. 20020010574); and U.S. patent application Ser. No. 09/991,079, filed Nov. 16, 2001 (U.S. patent application Pub. No. 20020116176). These applications are incorporated herein by reference in their entirety.

The present application, while not claiming priority to, may also be related to the following U.S. patent: U.S. Pat. No. 6,167,370, "Document semantic analysis/selection with knowledge creativity capability utilizing subject-action-object (SAO) structures," issued Dec. 26, 2000 to Tsourikov et al. U.S. Pat. No. 6,167,370 is incorporated herein by reference in its entirety.

BACKGROUND

1. Field

This application relates to systems and methods of automatic knowledge recognition and extraction from the documents in electronic or digital form, which reflect outside world regularities in the form of cause-effect relations between the facts.

2. Description of Related Art

The following U.S. Patent documents provide descriptions of art related to the present application: U.S. Pat. No. 5,418,889, issued May 1995 to Ito (hereinafter Ito); U.S. Pat. No. 6,185,592, issued Feb. 2001 to Boguraev et al. (hereinafter Boguraev 1); U.S. Pat. No. 6,212,494, issued Apr. 2001 to Boguraev (hereinafter Bogureav 2); U.S. Pat. No. 6,263,335, issued Jul. 2001 to Paik et al. (hereinafter Paik); U.S. Pat. No. 6,754,654, issued Jun. 2004 to Kim et al. (hereinafter Kim); U.S. Pat. No. 6,823,325, issued Nov. 2004 to Davies et al. (hereinafter Davies); and U.S. Pat. No. 6,871,199, issued Mar. 2005 to Binnig et al. (hereinafter Binnig).

Knowledge engineering is the major tool for intellectualization of modem information technologies. Knowledge engineering was traditionally based on generalization of information obtained from experts in different knowledge domains. However, analysis shows that this approach cannot be utilized for creating adequate real-life (industrial) applications. Two questions arise: first, what can be the most reliable and effective source of such knowledge; and second, how can this knowledge be recognized, extracted and later formalized. Analysis shows, that at the present time, the time of global computerization, the most reliable source of knowledge is text in the broad sense of the word, that is, text as a set of documents in natural language (books, articles, patents, reports etc.). Thus, the basic premises of knowledge engineering in the light of the second question are as follows:

1 text is the ideal natural and intellectual model of knowledge representation 2. one can find everything in the text The second premise may seem excessively categorical, but with the tendency to increase the text range, this is more and more the case.

What types of knowledge can be obtained from text and with what automatic means? Some existing methods are aimed at databases having a strict structure and manually compiled or at texts with strictly defined fields. A shallow linguistic analysis of text is usually performed. Kim describes processing text with a rigid structure (primarily emails). Kim's process extracts corresponding information from previously known fields of source documents and places it in predefined fields of a database (DB) that reflects the structure of the organization (such a DB has, for example, fields for names and titles of individuals within an organization). The linguistic processing described in Kim is utilized only for the extraction of key terms from documents according to the so-called filters.

Davies describes the performance of lexical and grammatical analysis of text in order to differentiate nouns from verbs and to perform in such a way a strongly definite search in a predefined and structured database according to "how", "why", "what" and "what is" relations.

Binnig also describes the use of a pre-structured database (i.e., a Knowledge Database) in the form of a fractal hierarchical network, which reflects the knowledge of the outside world (knowledge domain) in order to automatically expand information from an input string. Initially the input string (for example, part of sentence, or the whole sentence, etc.) is treated with a semantic processor that performs syntactic and grammatical parsing and transforming to build an input network. This network is then "immersed" into the Knowledge Database to expand the input information, that is, some kind of recording and later expansion of input information by means of a model of the outside world concerning objects, their relations and attributes.

Boguraev 1 describes the performance of a deep text analysis where, for text segments, the most significant noun groups are marked on the basis of their usage frequency in weighted semantic roles.

All abovementioned cases concern a particular knowledge about concepts. This is an entry level of knowledge that can be extracted from text.

Boguraev 2 describes the use of computer-mediated linguistic analysis to create a catalog of key terms in technical fields and to also determine doers (solvers) of technical functions (verb-object).

Ito describes the use of a Knowledge Base including Causal Model Base and Device Model Base. The Device Model Base has sets of device knowledge describing the hierarchy of devices of the target machine. The Casual Model Base is formed on the basis of the Device Model Base and has sets of casual relations of fault events in the target machine. Thus, the possible cause of failure in each element of the device is guessed on the basis of information about its structural connections with other elements of the device. Usually, these are the most "connected" elements, which are determined as the cause.

Paik describes a system that is domain-independent and automatically builds its own subject knowledge base. The system recognizes concepts (any named entity or idea, such as a person, place, thing or organization) and relations between them. These relations allow the creation of concept-relation-concept triples. So the knowledge recognized in Paik is close to the next important knowledge level—facts (subject—action—object), although they are not facts yet. Paik also mentions "cause" relations between concepts (in the context of concept-relation-concept triples). However, this is not yet the Cause-Effect relations between the facts, which is the next very important level of knowledge, because it is this knowledge that reflects the outside world regularities (or the regularities of knowledge domain).

SUMMARY

Embodiments of the present invention provide the ability for a computer to automatically extract from the arbitrary text documents the knowledge about the outside world (knowledge domain) in the form of facts (seven-field semantic units of the eSAO type: Subject—Action—Object—Adjective—Preposition—Indirect Object—Adverbial) and the rules reflecting regularities of the outside world (knowledge domain) in the form of cause-effect relations between the facts. The automatic recognition of cause-effect relations between the facts is performed by the Semantic Processor, which carries out the preformatting of the text and a linguistic (including semantic) analysis of the text. The Semantic Processor further generates a Cause-Effect Knowledge Base using this analysis and custom recognizing linguistic models formed as patterns.

Linguistic analysis of the text includes: part-of-speech tagging, parsing and semantic analysis. During the stage of semantic analysis, the Semantic Processor recognizes objects, semantic relations between them of eSAO type (facts) and cause-effect relations between the facts (both complete and incomplete), as well as these relations in separate facts. The cause-effect relations recognition is performed based on the results of linguistic analysis of the text and patterns, which describe algorithms for detecting Cause-Effect (C-E) relations inside a single eSAO and between different eSAO. These patterns describe first, their use environment, i.e., indicators of the presence of C-E relations in the sentence, and second, information about which eSAO components or whole eSAO act as a Cause part of the relation and which eSAO components or whole eSAO act as an Effect. Cause-Effect indicators refer to separate eSAO components and describe linguistic units, their lexical and grammatical tags, classes, etc. For example, one of patterns says, if a sentence contain two eSAO, the first one has non-empty Subject and Action, the second one has non-empty Action and Object, and there's a conjunction "so that" or "such that" between them in the sentence, these eSAO are in Cause-Effect relations, the first one being the Cause, the second one being the Effect part.

The Cause-Effect Recognizer analyzes all eSAOs and pairs of eSAOs for compliance with one of the patterns from the common list. If an eSAO complies with a rule, the Cause-Effect Recognizer registers the presence of Cause-Effect relation and puts it into Cause-Effect Knowledge Base.

The procedure of creating recognizing linguistic models is based on the analyzing big text corpora, revealing particular indicators of Cause-Effect relations and their following generalization into patterns and testing. These patterns, as well as different dictionaries, grammars, etc. comprise the Linguistic Knowledge Base, one of the major components of the Semantic Processor.

DETAILED DESCRIPTION

Figure 1:
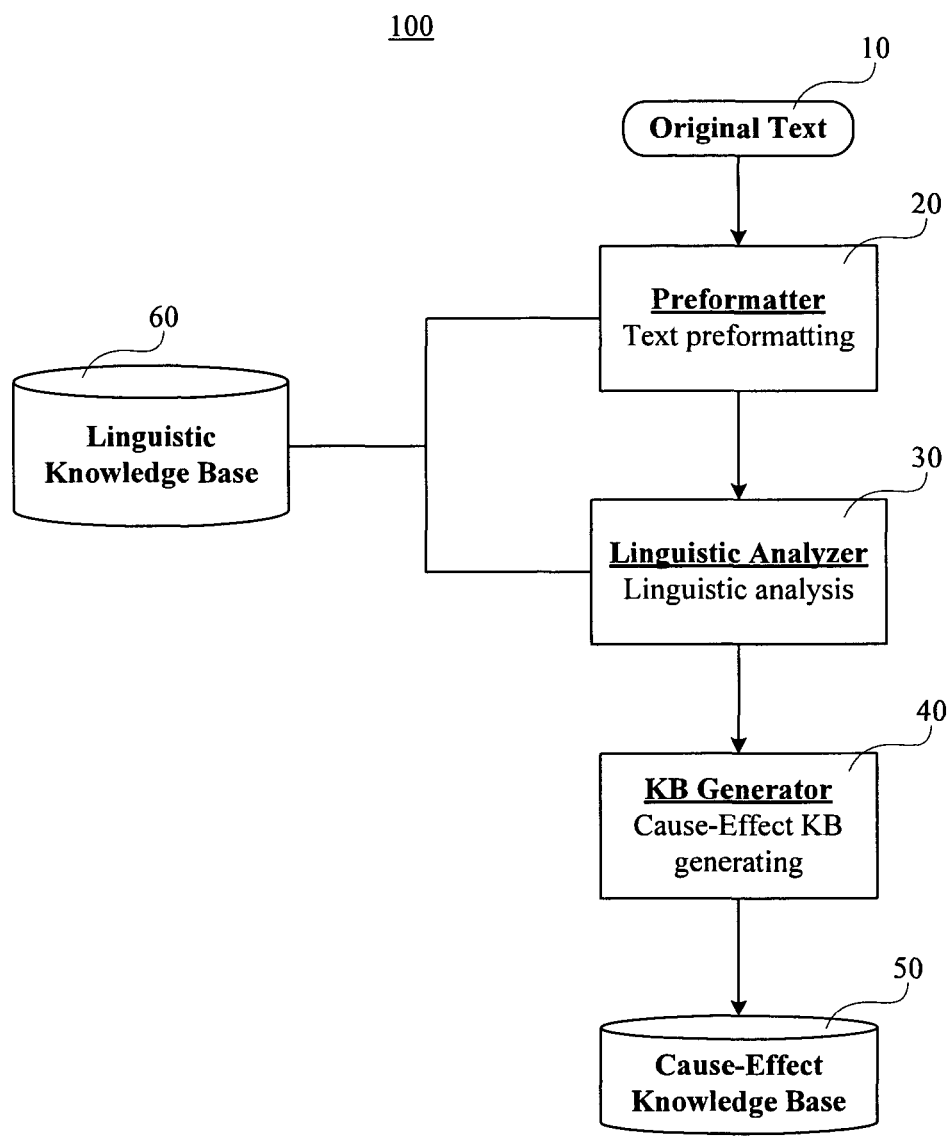
FIG. 1 is a structural and functional scheme of the Semantic Processor according to an embodiment of the present invention.

Embodiments of the present invention relate to a system and method for automatic recognition of the three classical types of knowledge of the outside world: objects (concepts); facts; and cause-effect relations between the facts formulated in the form of rules that reflect regularities of the outside world (subject domain). Automatic detection of objects and facts, that is, semantic relations between objects in the Subject—Action—Object format (SAO), is described in U.S. Pat. No. 6,167,370, titled "Document Semantic Analysis/Selection with Knowledge Creativity Capability."

In prior art systems, SAOs included only three components or element types: Subject (S), Action (A) and Object (O). In this prior art, at least one of these components must be defined in the SAO. However, in accordance with embodiments of the present invention, expanded SAOs (eSAOs) are used. In a preferred embodiment, eSAOs include seven components, where, again, at least one component is defined. The additional components provide a greater depth and quality of analysis. In other embodiments, the eSAOs could be expanded to include additional components. In this document, the terms "eSAO" and "eSAO set" are used interchangeably, where both terms refer to a collection of eSAO components.

In a preferred embodiment, the eSAO components comprise:

1. Subject (S), performs an action (A) on an object (O);

2. Action (A), performed by a subject (S) on an object (O);

3. Object (O), acted upon by a subject (S) with an action (A);

4. Adjective (Adj), characterizes subject (S) or action (A) which follows the subject in the eSAO with empty object (O) (e.g. "The invention is "efficient"," "The water becomes "hot"");

5. Preposition (Prep), governs an indirect object (IO) (e.g. "The lamp is placed "on" the table", "The device reduces friction "by" ultrasound");

6. Indirect Object (IO), manifested, as a rule, by a noun phrase, which together with a preposition characterizes an action (A), being an adverbial modifier (e.g. "The lamp is placed on the "table"", "The device reduces friction by "ultrasound""); and 7. Adverbial (Adv), characterizes, as a rule, the conditions of the performing action (A) (e.g. "The process is "slowly" modified", "The driver must not turn wheel "in such a manner""")

Examples of the application of the eSAO format are shown in Table 1 and Table 2:

TABLE 1

| Input Sentence: | |
|---|---|
| A dephasing element guide completely suppresses unwanted modes. | |
| Output: | |
| Subject | dephasing element guide |
| Action | suppress |
| Object | unwanted mode |
| Preposition | — |
| Indirect Object | — |
| Adjective | — |
| Adverbial | completely |

TABLE 2

| Input Sentence: | |
|---|---|
| The maximum value of x is dependent on the ionic radius of the lanthanide element. | |
| Output: | |
| Subject | maximum value of x |
| Action | be |
| Object | — |
| Preposition | on |
| Indirect Object | ionic radius of the lanthanide element |
| Adjective | dependent |
| Adverbial | |

Semantic relations of the Cause-Effect type between facts, i.e., between eSAOs, are discussed in U.S. patent application Pub. No. 20030130837, titled "Computer Based Summarization of Natural Language Documents." Recognition of Cause-Effect relations is also described in that publication. For example, the input sentence "Today the user can download 10,000 papers from the web by typing the word "screen" will result in the Cause-Effect relation between eSAOs shown in Table 3.

TABLE 3

| Cause: | |
|---|---|
| CauseSubject | user |
| CauseAction | type |
| CauseObject | word "screen" |
| CausePreposition | — |
| CauseIndirectObject | — |
| CauseAdjective | — |
| CauseAdverbial | |
| Effect: | |
| EffectSubject | user |
| EffectAction | download |
| EffectObject | 10,000 papers |
| EffectPreposition | from |
| EffectIndirectObject | web |
| EffectAdjective | — |
| EffectAdverbial | |

Embodiments of the present invention address the semantic processing used to establish the Cause-Effect relations present in the knowledge within natural language documents.

In accordance with embodiments of the present invention, the semantic processing for recognizing Cause-Effect relations in text in electronic or digital form comprises: preformatting the text; performing linguistic analysis; and generating a Cause-Effect Knowledge Base.

An embodiment of a Cause-Effect Semantic Processor, hereinafter Semantic Processor (SP), in accordance with the present invention may be appreciated with reference to FIG. 1. The Semantic Processor 100 processes an original text 10 to generate a Cause-Effect Knowledge Base 50. In this embodiment, the Semantic Processor 100 includes a Preformatter 20 (for preformatting the original text), a Linguistic Analyzer 30 (for performing linguistic analysis) and a Knowledge Base Generator 40 (for generating the Cause-Effect Knowledge Base 50). The functionality of all the modules of the Semantic Processor 100 may be maintained within a Linguistic Knowledge Base 60, which includes various databases, such as dictionaries, classifiers, statistical data, etc., and a database for recognizing linguistic models (for text-to-words splitting, recognition of noun and verb phrases, subject, object, action and their attributes, cause-effect recognition, etc.). The Linguistic Analyzer 30 and the Knowledge Base Generator 40 are described in additional detail below.

The text preformatting performed by the Preformatter 20 is preferably performed according to the techniques described in U.S. patent application Pub. No. 20030130837. The Preformatter 20 preferably removes any symbols in a digital or electronic representation of the text that do not form part of natural language text. For example, the Preformatter 20 may remove: formatting symbols such as paragraph marks, tab characters, etc.; font control symbols such as font color and font size; and other symbols that may be used to control how text is displayed, but does affect the meaning of the text. The Preformatter 20 may also detect and correct any mismatches or mistakes in the original text 10. The Preformatter 20 may also partition the original text 10 into structures of sentences and words to create Preformatted Text 12 (see FIG. 2). The description above should not be interpreted as describing all of the functions that may be performed by the Preformatter 20. The Preformatter 20 may also perform other text manipulation functions to better prepare the original text 10 for the Linguistic Analyzer 30 described below.

Figure 2:
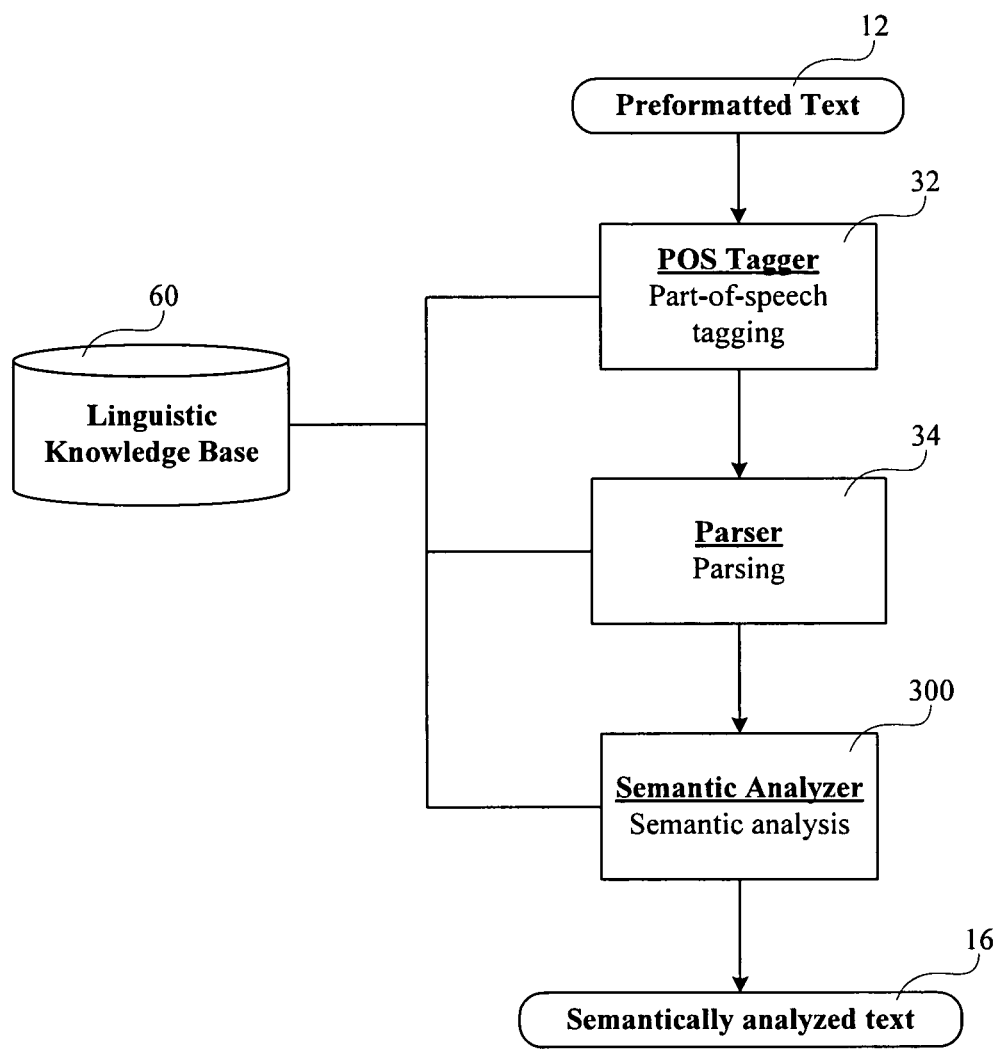
FIG. 2 is a structural and functional scheme of the Linguistic Analyzer according to an embodiment of the present invention.

FIG. 2 illustrates the modules comprising the Linguistic Analyzer 30. The Linguistic Analyzer 30 processes preformatted text from the Preformatter 20 to produce semantically analyzed text 16. The preformatted text 12 is received by a Parts-of-Speech Tagger 32 (which determines and applies parts-of-speech tags to the preformatted text 12). The Parser 34 then parses the POS tagged text for processing by the Semantic Analyzer 300. The functions performed by the POS Tagger and the Parser 34 are preferably performed in accord with the techniques described in U.S. patent application Pub. No. 20030130837.

In the Linguistic Analyzer, the POS Tagger 32 assigns each word of the preformatted text 12 a part-of-speech tag. Preferably, the part-of-speech tagging is based on statistical data that forms part of the Linguistic Knowledge Base 60. The tags typically correspond to parts of speech. Examples of tags include: JJ—adjective, VB—verb, NN—noun and so on. Embodiments of the present invention may use parts-of-speech tags known in the art. The Parser 34 performs operations to recognize verbal sequences and noun phrases in the tagged text and to build a syntactical parsed tree. To facilitate the generation of the syntactical parsed tree, Linguistic Knowledge Base 60 includes Recognizing Linguistic Models. These models comprise rules for the structuring of a sentence, i.e., for correlating part-of-speech tags and syntactic groups (classes). Thus, in the preferred form, the first stage of the Parser 34 deals with POS tags, and then the Parser 34 gradually substitutes sequences of POS tags with syntactic groups. These groups are then substituted by other groups, higher in the sentence hierarchy, thus building a multi-level syntactic structure of a sentence in the form of a tree, i.e., a syntactical parsed tree. This tree is then passed to the Semantic Analyzer 300.

Figure 3:
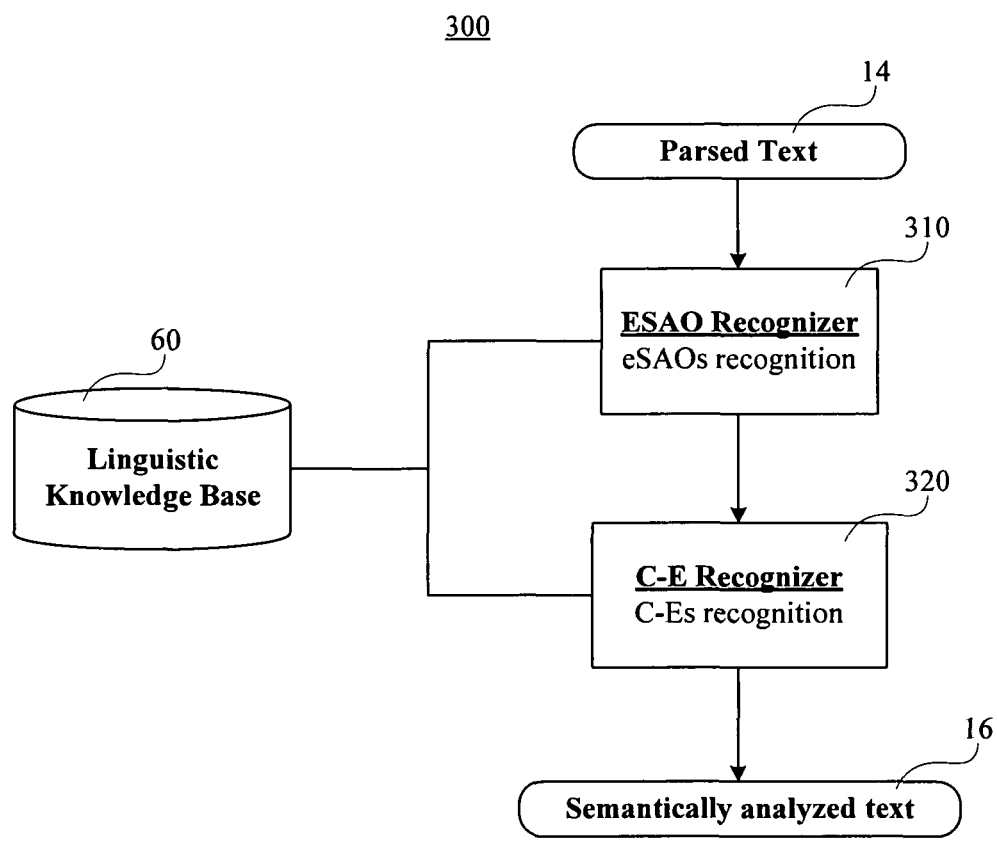
FIG. 3 is a structural and functional scheme of the Semantic Analyzer according to an embodiment of the present invention.

FIG. 3 illustrates the modules comprising the Semantic Analyzer 300. The Semantic Analyzer 300 receives parsed text 14 and produces the semantically analyzed text 16. The Semantic Analyzer 300 has an eSAO Recognizer 310 that performs eSAO recognition. ESAO recognition is preferably performed in accord with the techniques described in U.S. patent application Pub. 20020010574 and U.S. patent application Pub. No. 20020116176. The recognition of all eSAO elements is implemented by means of corresponding Recognizing Linguistic Models that are the part of the Linguistic Knowledge Base 60. These models describe rules that use part-of-speech tags, lexemes and syntactic categories which are then used to extract from the parsed text eSAOs with finite actions, non-finite actions, verbal nouns. One example of an Action extraction rule is:

<HVZ><BEN><VBN>=>(<A>=<VBN>)

This rule means that "if an input sentence contains a sequence of words w1, w2, w3 which at the step of part-of-speech tagging obtained HVZ, BEN, VBN tags respectively, then the word with VBN tag in this sequence is an Action". For example, the phrase "has been produced" would be parts-of-speech tagged as "has_HVZ been_BEN produced_VBN" and the rule would show that "produce" is an Action. i.e., (A=produce). Furthermore, the voice of the action (active or passive voice) is taken into consideration in the rules for extraction of Subject and Object. Cause-Effect relations within and/or between the eSAOs is performed by the Cause-Effect (CE) Recognizer 320, which then produces the semantically analyzed text 16. Recognition of Cause-Effect relations according to embodiments of the present invention is described in additional detail below.

Cause-Effect relations according to embodiments of the present invention comprise pairing one or more eSAOs (both complete and incomplete) as causes with one or more eSAOs as effects (again complete and incomplete). Formally a Cause-Effect relation can be represented as follows:

$$\{eSAO_i\} \rightarrow \{eSAO_j\}$$

where a set $\{eSAO_i\}$ represents a Cause, a set $\{eSAO_j\}$ represents an Effect, and an "→" represents a sequential operator relating the Cause and the Effect with certain lexical, grammatical and semantic language means. Note that a single eSAO can spawn both a cause eSAO and an effect eSAO. Also, from the point of view of knowledge engineering and natural language particularities, cause-effect relations can be found in a separate eSAOs. This case will be regarded separately. The case of a single eSAO spawning both cause and effect eSAOs will be considered first.

The Cause-Effect Recognizer 320 uses algorithms for detecting cause-effect relations in text sentences inside a single eSAO and between different eSAOs. These algorithms may be categorized as generating linguistic models or patterns. These patterns describe first, their use environment, i.e. indicators of presence of C-E relations in a sentence, and second, the information about which eSAO components or whole eSAOs act as a Cause part of the relation and which eSAO components or whole eSAOs act as an Effect. Cause-Effect indicators refer to separate eSAO components and describe linguistic units, their lexical and grammatical tags, classes, etc.

The Cause-Effect Recognizer 320 preferably analyses all eSAOs and pairs of eSAO for compliance with one of the patterns from a common list. If an eSAO or pair of eSAOs comply with a pattern, the Cause-Effect Recognizer 320 registers the presence of Cause-Effect relation and marks the eSAO or pair of eSAOs for inclusion in the Cause-Effect Knowledge Base 50. The Knowledge Base Generator 40 performs the collection of the eSAOs that present Cause-Effect information and generates the Cause-Effect Knowledge Base 50 based on this information. The Knowledge Base Generator 40 may also edit the Cause-Effect relations before entry into the Cause-Effect Knowledge Base 50. For example, the Knowledge Base Generator 40 may remove (or not enter) repeating Cause-Effect relations.

Presented below are preferred patterns for recognizing Cause-Effect relations in text. However, other patterns may be used in accord with embodiments of the present invention.

I. Patterns for recognition of Cause-Effect relations from a single eSAO

Pattern 1: Action with "Cause" Sense

This pattern arises if an eSAO is recognized in the text and the eSAO has at least three non-empty fields for Subject, Action and Object and the Action field has a "CAUSE" sense. A C-E relation is then formed where the Subject of the eSAO becomes the "Cause" part of the output relation and the Object of the eSAO becomes the "Effect" part of the relation. In this pattern, a "CAUSE" Action sense is a nonterminal symbol denoting any lexical unit having a meaning related to a causal action. For example, in a preferred embodiment, "CAUSE" at least equals the words or phrases "cause|result in|create|develop|induce|activate|actuate|arouse|bring about|bring forth|bring on|generate|produce|etc." In English, more than 40 lexical units may be considered to be of the "CAUSE" type. Table 4 shows the generic form of Pattern 1.

TABLE 4

| Subject | exist | Cause |
|---|---|---|
| Action | CAUSE | |
| Object | exist | Effect |
| Preposition | — | |
| Indirect Object | — | |
| Adjective | — | |
| Adverbial | | |

As example, consider the input sentence to be "The vacuum knife causes a shearing air flow." Table 5 shows the eSAO extracted from the sentence:

TABLE 5

| Subject | vacuum knife |
|---|---|
| Action | cause |
| Object | shearing air flow |
| Preposition | — |
| Indirect Object | — |
| Adjective | — |
| Adverbial | |

Because this eSAO meets the conditions of Pattern 1, the following C-E relation (shown in Table 6) is obtained:

TABLE 6

| Cause: | |
|---|---|
| CauseSubject | vacuum knife |
| CauseAction | — |
| CauseObject | — |
| CausePreposition | — |
| CauseIndirectObject | — |
| CauseAdjective | — |
| CauseAdverbial | |

TABLE 6-continued

| Effect: | |
|---|---|
| EffectSubject | — |
| EffectAction | — |
| EffectObject | shearing air flow |
| EffectPreposition | — |
| EffectIndirectObject | — |
| EffectAdjective | — |
| EffectAdverbial | — |

Pattern 2: Actions with "Result From" Sense

Pattern 2 arises if the Action field has a "RESULT FROM" sense. In this pattern, a "RESULT FROM" Action sense is a nonterminal symbol denoting any lexical unit having a meaning related to a resulting from action. For example, in a preferred embodiment, "RESULT FROM" at least equals the words or phrases "derive from|result from|spring from|stem from." Table 7 shows the generic form of Pattern 2.

TABLE 7

| Subject | exist | Effect |
|---|---|---|
| Action | RESULT | |
| Object | exist | Cause |
| Preposition | — | |
| Indirect Object | — | |
| Adjective | — | |
| Adverbial | — | |

For example, the input sentence of "In order to detect such unsafe situations resulting from insufficient air flow, a sail switch is utilized to measure the air flow in the combustion area as well as in the tumbler chamber," would result in the eSAO shown in Table 8. The C-E relation resulting from this input sentence according to a preferred embodiment of the present invention is shown in Table 9.

TABLE 8

| Subject | unsafe situations |
|---|---|
| Action | result from |
| Object | insufficient air flow |
| Preposition | — |
| Indirect Object | — |
| Adjective | — |
| Adverbial | — |

TABLE 9

| Cause: | |
|---|---|
| CauseSubject | insufficient air flow |
| CauseAction | — |
| CauseObject | — |
| CausePreposition | — |
| CauseIndirectObject | — |
| CauseAdjective | — |
| CauseAdverbial | — |
| Effect: | |
| EffectSubject | — |
| EffectAction | — |
| EffectObject | unsafe situations |
| EffectPreposition | — |
| EffectIndirectObject | — |
| EffectAdjective | — |
| EffectAdverbial | — |

Pattern 3: The "Cause of" Construction in Object

Pattern 3 arises if the Object has a "CAUSE OF" sense and the Action links the Subject to the Object with a "BE" sense. In this pattern, "CAUSE OF" Object sense is a nonterminal symbol denoting a noun phrase, which preferably conforms to the following pattern: a number of words; the words "cause" or "causes", the preposition "of"; followed by a number of words. The "CAUSE OF" sense can be represented by the equation:

$$CAUSE\_OF = .*(\text{"cause"}|\text{"causes"}) \text{ "of"} .*$$

In a preferred embodiment, the "BE" sense at least equals the words or phrases "be|become|contain|correspond|demonstrate|establish|identify|indicate|indicate|present|represent." Table 10 shows the generic form of Pattern 3.

TABLE 10

| Subject | exist | Cause |
|---|---|---|
| Action | BE | |
| Object | CAUSE_OF | Effect |
| Preposition | — | |
| Indirect Object | — | |
| Adjective | — | |
| Adverbial | — | |

For example, the input sentence of "The water steam presents the cause of metal corrosion" would result in the eSAO shown in Table 11. The C-E relation resulting from this input sentence according to a preferred embodiment of the present invention is shown in Table 12.

TABLE 11

| Subject | water steam |
|---|---|
| Action | present |
| Object | cause of metal corrosion |
| Preposition | — |
| Indirect Object | — |
| Adjective | — |
| Adverbial | — |

TABLE 12

| Cause: | |
|---|---|
| CauseSubject | water steam |
| CauseAction | — |
| CauseObject | — |
| CausePreposition | — |
| CauseIndirectObject | — |
| CauseAdjective | — |
| CauseAdverbial | — |
| Effect: | |
| EffectSubject | — |
| EffectAction | — |
| EffectObject | metal corrosion |
| EffectPreposition | — |
| EffectIndirectObject | — |
| EffectAdjective | — |
| EffectAdverbial | — |

Pattern 4: The "Cause of" Construction in Subject

Pattern 4 arises if the Subject has a "CAUSE OF" sense and the Action links the Subject to the Object with a "BE" sense. In this pattern, "CAUSE OF" Subject sense is again a nonterminal symbol denoting a noun phrase, which preferably conforms to the following pattern: a number of words; the words "cause" or "causes", the preposition "of"; followed by a number of words. The "CAUSE OF" sense can be represented by the equation:

$$CAUSE\_OF = .*(\text{"cause"}|\text{"causes"}) \text{ "of"} .*$$

In a preferred embodiment, the "BE" sense at least equals the words or phrases "be|become" Table 13 shows the generic form of Pattern 4.

TABLE 13

| Subject | CAUSE_OF | Effect |
|---|---|---|
| Action | BE | |
| Object | Exist | Cause |
| Preposition | — | |
| Indirect Object | — | |
| Adjective | — | |
| Adverbial | | |

For example, the input sentence of "The cause of water evaporation is heat" would result in the eSAO shown in Table 14. The C-E relation resulting from this input sentence according to a preferred embodiment of the present invention is shown in Table 15.

TABLE 14

| Subject | cause of water evaporation |
|---|---|
| Action | be |
| Object | heat |
| Preposition | — |
| Indirect Object | — |
| Adjective | — |
| Adverbial | |

TABLE 15

| Cause: | |
|---|---|
| CauseSubject | heat |
| CauseAction | — |
| CauseObject | — |
| CausePreposition | — |
| CauseIndirectObject | — |
| CauseAdjective | — |
| CauseAdverbial | |
| Effect: | |
| EffectSubject | — |
| EffectAction | — |
| EffectObject | water evaporation |
| EffectPreposition | — |
| EffectIndirectObject | — |
| EffectAdjective | — |
| EffectAdverbial | — |

Pattern 5: Action with "Technical" Sense

Pattern 5 arises if Action has a "TECHNICAL_ACTION" sense. In this pattern, "TECHNICAL_ACTION" Action sense is a nonterminal symbol denoting any lexical unit from a list of actions having a technical meaning, i.e. exercising some action on the object (changing its property or parameter). In English, more than 3000 lexical units may be considered as satisfying the "TECHNICAL_ACTION" sense. For example, the "TECHNICAL_ACTION" sense may comprise the words or phrases "abate|abrade|absorb|accelerate|emulsify|enamel|nitrogenize|straighten|soften|shield|protect|pressurize." Table 16 shows the generic form of Pattern 5.

TABLE 16

| Subject | exist | Cause |
|---|---|---|
| Action | TECHNICAL_ACTION | Effect |
| Object | exist | |
| Preposition | — | |
| Indirect Object | — | |
| Adjective | — | |
| Adverbial | | |

For example, the input sentence of "The power plant generates electrical current" would result in the eSAO shown in Table 17. The C-E relation resulting from this input sentence according to a preferred embodiment of the present invention is shown in Table 18.

TABLE 17

| Subject | power plant |
|---|---|
| Action | generate |
| Object | electrical current |
| Preposition | — |
| Indirect Object | — |
| Adjective | — |
| Adverbial | |

TABLE 18

| Cause: | |
|---|---|
| CauseSubject | the power plant |
| CauseAction | |
| CauseObject | |
| CausePreposition | |
| CauseIndirectObject | |
| CauseAdjective | |
| CauseAdverbial | |
| Effect: | |
| EffectSubject | |
| EffectAction | generate |
| EffectObject | electrical current |
| EffectPreposition | |
| EffectIndirectObject | |
| EffectAdjective | |
| EffectAdverbial | |

Pattern 6: Process Noun in Object 1

Pattern 6 arises if Object has a "PROCESS_NN" sense and Action has a "LINK_ACTION" sense. In this pattern, "PROCESS_NN" Object sense is a nonterminal symbol denoting any lexical unit from a list of nouns denoting a process or processes. In English, more than 6000 lexical units may be considered as satisfying the "PROCESS_NN" sense. For example, the "PROCESS_NN" sense may comprise the words or phrases "abhesion|acetation|clearing|coextrusion|equilibration|filtering|hydration|isolation|oscillation|phosphating." "LINK_ACTION" Action sense is a nonterminal symbol denoting any lexical unit from a list of "link actions," which will be omitted in the output relation. Preferably, the "LINK_ACTION" sense comprises the words "allow|do|execute|make|perform|permit|produce|propose|provide|realize|reestablish|reproduce." Table 19 shows the generic form of Pattern 6.

TABLE 19

| Subject | exist | cause |
|---|---|---|
| Action | LINK_ACTION | |
| Object | PROCESS_NN | effect |
| Preposition | — | |
| Indirect Object | — | |
| Adjective | — | |
| Adverbial | | |

For example, the input sentence of "Alkali water performs polishing" would result in the eSAO shown in Table 20. The C-E relation resulting from this input sentence according to a preferred embodiment of the present invention is shown in Table 21.

TABLE 20

| Subject | alkali water |
|---|---|
| Action | perform |
| Object | polishing |
| Preposition | — |
| Indirect Object | — |
| Adjective | — |
| Adverbial | |

TABLE 21

| Cause: | |
|---|---|
| CauseSubject | alkali water |
| CauseAction | |
| CauseObject | |
| CausePreposition | |
| CauseIndirectObject | |
| CauseAdjective | |
| CauseAdverbial | |
| Effect: | |
| EffectSubject | |
| EffectAction | |
| EffectObject | polishing |
| EffectPreposition | |
| EffectIndirectObject | |
| EffectAdjective | |
| EffectAdverbial | |

Pattern 7: Process Noun in Object 2

Pattern 7 arises if Object has a "PROCESS_NN" sense and Action has a "LINK_TECH_ACTION" sense. In this pattern, "PROCESS_NN" Object sense is again a nonterminal symbol denoting any lexical unit from a list of nouns denoting a process or processes. In English, more than 6000 lexical units may be considered as satisfying the "PROCESS_NN" sense for this pattern. For example, in this pattern, the "PROCESS_NN" sense may comprise the words or phrases "abhesion|acetation|clearing|coextrusion|equilibration|filtering|hydration|isolation|oscillation|phosphating."
"LINK_TECH_ACTION" Action sense is a nonterminal symbol denoting any lexical unit from a list of actions, which are not purely technical, but have technical meaning when used with a noun denoting a process or processes in Object. In English, "LINK_TECH_ACTION" may comprise over 70 different lexical units. For example, the "LINK_TECH_ACTION" sense may comprise at least the words "accomplish|achieve|acquire|actuate|aid|assist|assure|attain|avoid|begin|carry out|compel|complete|constrain." Table 22 shows the generic form of Pattern 7.

TABLE 22

| Subject | exist | cause |
|---|---|---|
| Action | LINK_TECH_ACTION | effect |
| Object | PROCESS_NN | |
| Preposition | — | |
| Indirect Object | — | |
| Adjective | — | |
| Adverbial | | |

For example, the input sentence of "Multiple changes of direction facilitate separation of water and debris from the air" would result in the eSAO shown in Table 23. The C-E relation resulting from this input sentence according to a preferred embodiment of the present invention is shown in Table 24.

TABLE 23

| Subject | multiple changes of direction |
|---|---|
| Action | facilitate |
| Object | separation of water and debris |
| Preposition | from |
| Indirect Object | air |
| Adjective | — |
| Adverbial | — |

TABLE 24

| Cause: | |
|---|---|
| CauseSubject | multiple changes of direction |
| CauseAction | |
| CauseObject | |
| CausePreposition | |
| CauseIndirectObject | |
| CauseAdjective | |
| CauseAdverbial | |
| Effect: | |
| EffectSubject | |
| EffectAction | facilitate |
| EffectObject | separation of water and debris |
| EffectPreposition | from |
| EffectIndirectObject | air |
| EffectAdjective | |
| EffectAdverbial | |

II. Patterns for Recognition of Cause-Effect Relations Between eSAOs

This section discusses the cause-effect relations that may be determined between eSAOs. The examples for the patterns in this section do not demonstrate eSAOs for each sentence, because these patterns do not change eSAOs when compiling cause-effect relations (as opposed to the patterns from the previous section, where cause-effect relations were extracted from a single eSAO).

Pattern 1: Adverbial Modifier of Purpose: TO VB|DO|HV

In this pattern, a first eSAO, considered to be related a cause, has an Action having the "ACTIVE" sense and a second eSAO, considered to be related to an effect, has an Action having the "TO_VB|HB|HV" sense. The "ACTIVE" Action sense is a nonterminal symbol that denotes an action extracted from the active voice verb group. The "TO_VB|HB|HV" Action sense is a nonterminal symbol that denotes an action extracted from the verb group consisting of verbs having the tags of: any infinitive verb (VB); infinitive "have" (HV); or infinitive "do" (DO), with the article "to" preceding the verb. Table 25 shows the generic form of Pattern 1.

TABLE 25

| Subject1 | exist | cause |
|---|---|---|
| Action1 | ACTIVE | |
| Object1 | | |
| Preposition1 | | |
| Indirect Object1 | | |
| Adjective1 | | |
| Adverbial1 | | |
| Subject2 | | effect |
| Action2 | TO_VB|DO|HV | |
| Object2 | exist | |
| Preposition2 | | |
| Indirect Object2 | | |
| Adjective2 | | |
| Adverbial2 | | |

For example, the input sentence of "The register contains the proper bit pattern to begin its shift-out operation" would result in the C-E relation shown in Table 26.

TABLE 26

| Cause: | |
|---|---|
| CauseSubject | The register |
| CauseAction | contain |
| CauseObject | the proper bit pattern |
| CausePreposition | |
| CauseIndirectObject | |
| CauseAdjective | |
| CauseAdverbial | |

| Effect: | |
|---|---|
| EffectSubject | |
| EffectAction | begin |
| EffectObject | shift-out operation |
| EffectPreposition | |
| EffectIndirectObject | |
| EffectAdjective | |
| EffectAdverbial | |

Pattern 2: Adverbial Modifier of Cause: BY VBG

In this pattern, a first eSAO is considered to be related to an effect, and a second eSAO, considered to be related to a cause, has an Action having the "BY_VBG" sense. The "BY_VBG" Action sense is a nonterminal symbol that denotes an action extracted from the participle construction consisting of a Participle I (gerund verb (VBG)) preceded by the preposition "by." Table 27 shows the generic form of Pattern 2.

TABLE 27

| Subject1 | exist | effect |
|---|---|---|
| Action1 | exist | |
| Object1 | | |
| Preposition1 | | |
| Indirect Object1 | | |
| Adjective1 | | |
| Adverbial1 | | |
| Subject2 | | cause |
| Action2 | BY_VBG | |
| Object2 | exist | |
| Preposition2 | | |
| Indirect Object2 | | |
| Adjective2 | | |
| Adverbial2 | | |

For example, the input sentence of "The evaporating treatment was carried out by passing air onto the tube" would result in the C-E relation shown in Table 28.

TABLE 28

| Cause: | |
|---|---|
| CauseSubject | |
| CauseAction | pass |
| CauseObject | air |
| CausePreposition | into |
| CauseIndirectObject | tube |
| CauseAdjective | |
| CauseAdverbial | |

| Effect: | |
|---|---|
| EffectSubject | |
| EffectAction | carry out |
| EffectObject | evaporating treatment |
| EffectPreposition | |
| EffectIndirectObject | |
| EffectAdjective | |
| EffectAdverbial | |

Pattern 3: Adverbial Modifier of Purpose: FOR VBG

In this pattern, a first eSAO is considered to be related to a cause and a second eSAO, considered to be related to an effect, has an Action having the "FOR_VBG" sense. The "FOR_VBG" Action sense is a nonterminal symbol that denotes an action extracted from the participle construction consisting of a Participle I (gerund verb (VBG)) preceded by the preposition "for." Table 29 shows the generic form of Pattern 3.

TABLE 29

| Subject1 | exist | cause |
|---|---|---|
| Action1 | exist | |
| Object1 | | |
| Preposition1 | | |
| Indirect Object1 | | |
| Adjective1 | | |
| Adverbial1 | | |
| Subject2 | | effect |
| Action2 | FOR_VBG | |
| Object2 | exist | |
| Preposition2 | | |
| Indirect Object2 | | |
| Adjective2 | | |
| Adverbial2 | | |

For example, the input sentence of "The developed control signal is applied to the bias voltage generator for varying the bias voltage" would result in the C-E relation shown in Table 30.

TABLE 30

| Cause: | |
|---|---|
| CauseSubject | |
| CauseAction | apply |
| CauseObject | the developed control signal |
| CausePreposition | to |
| CauseIndirectObject | the bias voltage generator |
| CauseAdjective | |
| CauseAdverbial | |

| Effect: | |
|---|---|
| EffectSubject | |
| EffectAction | vary |
| EffectObject | the bias voltage |
| EffectPreposition | |
| EffectIndirectObject | |
| EffectAdjective | |
| EffectAdverbial | |

Pattern 4: Adverbial Modifier of Purpose: THUS VBG

In this pattern, a first eSAO is considered to be related to a cause and a second eSAO, considered to be related to an effect, has an Action having the "THUS_VBG" sense. The "THUS_VBG" Action sense is a nonterminal symbol that denotes an action extracted from a verb phrase consisting of a Participle I (gerund verb (VBG)) preceded by any of the following adverbs: "thus," "thereby," and "therefore." Table 31 shows the generic form of Pattern 4.

TABLE 31

| Subject1 | exist | cause |
|---|---|---|
| Action1 | exist | |
| Object1 | | |
| Preposition1 | | |
| Indirect Object1 | | |
| Adjective1 | | |
| Adverbial1 | | |
| Subject2 | | effect |
| Action2 | THUS_VBG | |
| Object2 | exist | |
| Preposition2 | | |
| Indirect Object2 | | |
| Adjective2 | | |
| Adverbial2 | | |

For example, the input sentence of "The aforementioned armature is secured to the side plates by pivot devices, thus obtaining excellent mechanical operation" would result in the C-E relation shown in Table 32.

TABLE 32

| Cause: | |
|---|---|
| CauseSubject | |
| CauseAction | secure |
| CauseObject | the aforementioned armature |
| CausePreposition | to |
| CauseIndirectObject | the side plates |
| CauseAdjective | |
| CauseAdverbial | |

| Effect: | |
|---|---|
| EffectSubject | |
| EffectAction | obtain |
| EffectObject | excellent mechanical operation |
| EffectPreposition | |
| EffectIndirectObject | |
| EffectAdjective | |
| EffectAdverbial | |

Pattern 5: Subject in the Form of a Participle Phrase

This patterns occurs when the Action of the first eSAO has the sense "VBG," that is, the action was extracted from the verb consisting of a Participle I (gerund verb (VBG), and the Action of the second eSAO can be described by the senses "TECHNICAL_ACTION," "LINK_ACTION," or "LINK_TECH_ACTION," and the Object can be any non-empty string in case where the Action is "TECHNICAL_ACTION" or "PROCESS_NN" in case where the Action is "LINK_ACTION" or "LINK_TECH_ACTION." The "Effect" part of the output C-E relation will not include actions corresponding to nonterminal symbol "LINK_ACTION." "TECHNICAL_ACTION," "LINK_ACTION," "LINK_TECH_ACTION," and "PROCESS_NN" are defined as they have been defined above for patterns based on single eSAOs. Table 33 shows the generic form of Pattern 5.

TABLE 33

| Subject1 | | cause |
|---|---|---|
| Action1 | VBG | |
| Object1 | exist | |
| Preposition1 | | |
| Indirect Object1 | | |
| Adjective1 | | |
| Adverbial1 | | |
| Subject2 | | effect |
| Action2 | TECHNICAL_ACTION\| LINK_ACTION\| LINK_TECH_ACTION | |
| Object2 | Exist\|PROCESS_NN | |
| Preposition2 | | |
| Indirect Object2 | | |
| Adjective2 | | |
| Adverbial2 | | |

For example, the input sentence of "Forming all members from the same die facilitates economical manufacturing" would result in the C-E relation shown in Table 34.

TABLE 34

| Cause: | |
|---|---|
| CauseSubject | |
| CauseAction | form |
| CauseObject | all members |
| CausePreposition | from |
| CauseIndirectObject | same die |
| CauseAdjective | |
| CauseAdverbial | |

| Effect: | |
|---|---|
| EffectSubject | |
| EffectAction | facilitate |
| EffectObject | economical manufacturing |
| EffectPreposition | |
| EffectIndirectObject | |
| EffectAdjective | |
| EffectAdverbial | |

Pattern 6: Adverbial Modifier of Cause DEPEND ON

This patterns occurs when the Action of the second eSAO has the sense "DEPEND_ON," that is, the action was extracted from the verb group consisting of "depend" or "depending" followed by the preposition "on." Table 35 shows the generic form of Pattern 6.

TABLE 35

| Subject1 | | effect |
|---|---|---|
| Action1 | exist | |
| Object1 | exist | |
| Preposition1 | | |
| Indirect Object1 | | |
| Adjective1 | | |
| Adverbial1 | | |
| Subject2 | | cause |
| Action2 | DEPEND_ON | |
| Object2 | | |
| Preposition2 | | |
| Indirect Object2 | | |
| Adjective2 | | |
| Adverbial2 | | |

For example, the input sentence of "The durometer hardness of the elastomeric tube can also be changed depending on the mechanical properties and design of the various stents to be crimped" would result in the C-E relation shown in Table 36.

TABLE 36

| Cause: | |
|---|---|
| CauseSubject | |
| CauseAction | depend on |
| CauseObject | the mechanical properties and design of the various stents |
| CausePreposition | |
| CauseIndirectObject | |
| CauseAdjective | |
| CauseAdverbial | |

| Effect: | |
|---|---|
| EffectSubject | |
| EffectAction | change |
| EffectObject | durometer hardness of the elastomeric tube |
| EffectPreposition | |
| EffectIndirectObject | |
| EffectAdjective | |
| EffectAdverbial | |

Pattern 7: Complex Sentence, CONJUNCTION CAUSE 1

This pattern occurs upon the recognition of a complex sentence with two eSAOs and a lexical unit corresponding to the "CONJUNCTION_CAUSE_1" sense precedes the two eSAOs. The C-E relation is extracted where the first eSAO becomes the Cause and the second one becomes the Effect part of C-E relation. The "CONJUNCTION_CAUSE_1" sense comprises at least the following words or phrases: "because|as|if|as long as|as soon as|for the reason that|in case|inasmuch|on condition that|provided|since." The Table 37 shows the generic form of Pattern 7.

TABLE 37

| CONJUNCTION_CAUSE_1 | | |
|---|---|---|
| Subject1 | exist | cause |
| Action1 | exist | |
| Object1 | | |
| Preposition1 | | |
| Indirect Object1 | | |
| Adjective1 | | |
| Adverbial1 | | |
| Subject2 | | effect |
| Action2 | exist | |
| Object2 | exist | |
| Preposition2 | | |
| Indirect Object2 | | |
| Adjective2 | | |
| Adverbial2 | | |

For example, the input sentence of "As soon as the switch has become warm, the electrical connection to the wire is interrupted" would result in the C-E relation shown in Table 38.

TABLE 38

| Cause: | |
|---|---|
| CauseSubject | the switch |
| CauseAction | become |
| CauseObject | |
| CausePreposition | |
| CauseIndirectObject | |
| CauseAdjective | warm |
| CauseAdverbial | |
| Effect: | |
| EffectSubject | |
| EffectAction | interrupt |
| EffectObject | the electrical connection |
| EffectPreposition | to |
| EffectIndirectObject | the wire |
| EffectAdjective | |
| EffectAdverbial | |

Pattern 8: Complex Sentence, CONJUNCTION CAUSE 2

This pattern occurs upon the recognition of a complex sentence with two eSAOs and a lexical unit corresponding to the "CONJUNCTION_CAUSE_2" sense separating the two eSAOs. The C-E relation is extracted where the first eSAO becomes the Effect and the second one becomes the Cause part of C-E relation. The "CONJUNCTION_CAUSE_2" sense comprises at least the following words or phrases: "because|as|if|as long as|as soon as|for the reason that|in case|inasmuch|on condition that|provided|since." Table 39 shows the generic form of Pattern 8.

TABLE 39

| | | |
|---|---|---|
| Subject1 | exist | Effect |
| Action1 | exist | |
| Object1 | | |
| Preposition1 | | |
| Indirect Object1 | | |
| Adjective1 | | |
| Adverbial1 | | |
| CONJUNCTION_CAUSE_2 | | |
| Subject2 | | Cause |
| Action2 | exist | |
| Object2 | exist | |
| Preposition2 | | |
| Indirect Object2 | | |
| Adjective2 | | |
| Adverbial2 | | |

For example, the input sentence of "This contact period can be further reduced if the milk and resin are stirred" would result in the C-E relation shown in Table 40.

TABLE 40

| Cause: | |
|---|---|
| CauseSubject | |
| CauseAction | stir |
| CauseObject | the milk and resin |
| CausePreposition | |
| CauseIndirectObject | |
| CauseAdjective | |
| CauseAdverbial | |
| Effect: | |
| EffectSubject | |
| EffectAction | reduce |
| EffectObject | this contact period |
| EffectPreposition | |
| EffectIndirectObject | |
| EffectAdjective | |
| EffectAdverbial | |

Pattern 9: Complex Sentence, CONJUNCTION EFFECT

This pattern occurs upon the recognition of a complex sentence with two eSAOs and a lexical unit corresponding to the "CONJUNCTION_EFFECT" sense separating the two eSAOs. The C-E relation is extracted where the first eSAO becomes the Cause and the second eSAO becomes the Effect part of C-E relation. The "CONJUNCTION_EFFECT" sense comprises at least the following words or phrases: "so that|such that". Table 41 shows the generic form of Pattern 8.

TABLE 41

| | | |
|---|---|---|
| Subject1 | exist | Cause |
| Action1 | exist | |
| Object1 | | |
| Preposition1 | | |
| Indirect Object1 | | |
| Adjective1 | | |
| Adverbial1 | | |
| CONJUNCTION EFFECT | | |
| Subject2 | | Effect |
| Action2 | exist | |
| Object2 | exist | |
| Preposition2 | | |
| Indirect Object2 | | |
| Adjective2 | | |
| Adverbial2 | | |

For example, the input sentence of "Side portions of the top surface are spaced from the side surfaces to define foul ball openings so that balls can fall from the top surface to the bottom surface" would result in the C-E relation shown in Table 42.

TABLE 42

Cause:

| CauseSubject | |
|---|---|
| CauseAction | space |
| CauseObject | side portions of the top surface |
| CausePreposition | from |
| CauseIndirectObject | the side surfaces |
| CauseAdjective | |
| CauseAdverbial | |

Effect:

| EffectSubject | balls |
|---|---|
| EffectAction | fall |
| EffectObject | |
| EffectPreposition | from |
| EffectIndirectObject | the top surface |
| EffectAdjective | |
| EffectAdverbial | |

Figure 4:
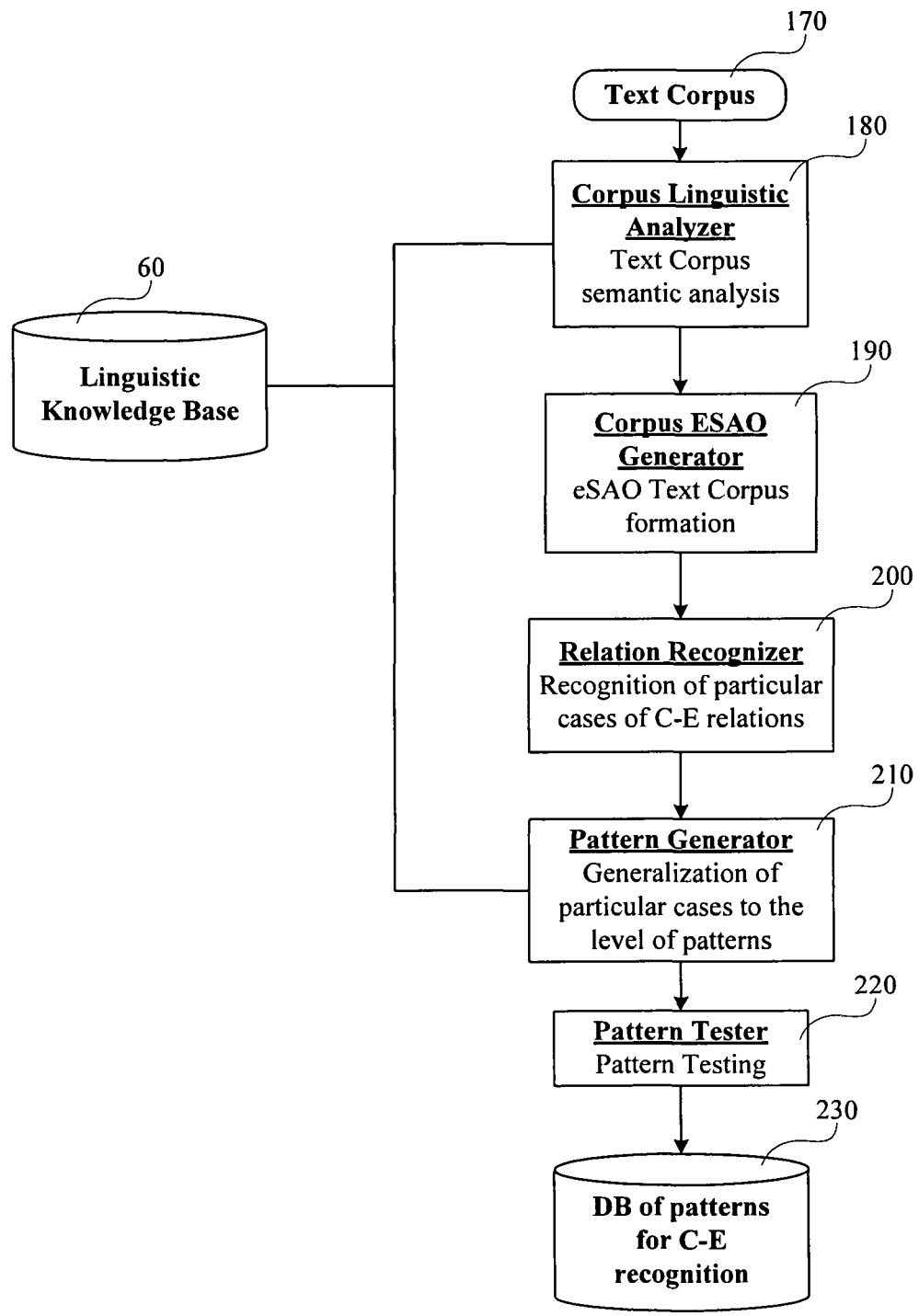
FIG. 4 is a principal scheme of building Data Base of C-E patterns according to an embodiment of the present invention.

FIG. 4 shows the modules that may be used to generate relationship models that may be used by embodiments of the present invention. As shown in FIG. 4, a sufficiently large corpus of text documents 170 are used to establish and form the models or patterns. The Corpus Linguistic Analyzer 180 performs a linguistic analysis on the corpus 170 to recognize eSAOs. The Corpus ESAO Generator 190 generates a corpus of sentences containing at least one eSAO. The Relation Recognizer 200 performs the process of recognition of some particular cases of C-E relations in the sentences containing at least one eSAO. The Pattern Generator 210 generalizes particular cases to more general patterns. The Pattern Tester 220 checks for the presence of Cause-Effect relations and places approved patterns into the database 230 for Cause-Effect relation recognition.

Preferably, the function of the Relation Recognizer 200 is carried out manually by experts. For example, an expert analyzes the sentence "The aforementioned armature is secured to the plates by pivot devices, thus obtaining excellent mechanical operation" from eSAO Text Corpus, where Linguistic Analyzer performed part-of-speech tagging, parsing and semantic analysis and recognized two eSAOs (see Table 31), and puts special tags that indicate that these eSAOs form part of a Cause-Effect relation. Then this sentence goes to the Pattern Generator 210.

The Pattern Generator 210 performs analysis and generalization of the C-E relations to the level of patterns. The function of the Pattern Generator is also preferably carried out manually by experts. In this way, an expert taking into consideration his or her own experience and knowledge and knowledge contained in Linguistic Knowledge Base. Returning to the previous example, the expert should come to a conclusion that adverbs "thereby" and "therefore" have meaning similar to the adverb "thus". Moreover, the word "thus" is followed by the word "obtaining" that has the tag VBG. Therefore, the expert registers the prototype of the pattern in the way represented in Table 30.

The Pattern Tester 220, using prototypical patterns, looks for the examples of Cause-Effect relations in eSAO Text Corpus. The expert analyzes the retrieved examples and approves the pattern (possibly with some corrections). The Pattern Tester 220 then puts this approved pattern into the Data Base 230 of patterns for C-E recognition.

As indicated above, both the Semantic Analyzer 180 and the Pattern Generator 210 may access the Linguistic Knowledge Base for the performance of their functions. Further, in some embodiments of the present invention, the Data Base 230 of patterns may be incorporated within the Linguistic Knowledge Base 60 to support the Cause-Effect semantic processing described above in regard to FIGS. 1-3.

Embodiments of the present invention may be provided by computer-executable instructions resident on one or more computers, microprocessors, microcontrollers, or other processing devices. The computer-executable instructions for executing the system and method may be resident in memory in the processing devices or may be provided to the processing devices by floppy disks, hard disks, compact disk (CDs), digital versatile disks (DVDs), read only memory (ROM), or any other storage medium.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . "

What is claimed is:

1. A computer-implemented method for recognizing cause-effect relations in natural language documents to generate a cause-effect knowledge base comprising:

recognizing a first expanded Subject-Action-Object (eSAO) set in a text from at least one natural language document using a processor, the first eSAO set including two or more eSAO components in the text grouped together to form a first semantic unit;

recognizing a second eSAO set in the text from the at least one natural language document using the processor, the second eSAO set including two or more eSAO components in the text grouped together to form a second semantic unit, the two or more eSAO components grouped together to form the second semantic unit being different from the two or more eSAO components grouped together to form the first semantic unit;

matching the first eSAO set and the second eSAO set against cause-effect (C-E) relationship patterns stored in a memory, wherein the C-E relationship patterns include indicators of a presence of a C-E relation in a sentence and information about an eSAO set in the sentence that acts as a cause part of the C-E relation and an eSAO set in the sentence that acts as an effect part of the C-E relation;

generating one or more eSAO cause-effect relations based on the matching, wherein each eSAO cause-effect relation identifies one of the first eSAO set and the second eSAO set as a cause eSAO and the other of the first eSAO set and the second eSAO set as an effect eSAO; and storing the one or more eSAO cause-effect relations in a knowledge base.

2. The method according to claim 1, wherein the first eSAO set includes three or more eSAO components in the text grouped together to form the first semantic unit, and wherein each of the three or more eSAO components in the text comprise text related to one or more elements of the group consisting of: subjects, objects, actions, adjectives, prepositions, indirect objects, and adverbs.

3. The method according to claim 1, wherein the cause eSAO comprises one or more of the eSAO components of the first eSAO set and the effect eSAO comprises one or more eSAO components of the second eSAO set.

4. The method according to claim 3, wherein the one or more eSAO cause-effect relations each comprise a sequential operator relating the eSAO components of the cause eSAO to the eSAO components of the effect eSAO with lexical, grammatical, and/or semantic language means.

5. The method according to claim 1, wherein matching the first eSAO set and the second eSAO set against cause-effect relationship patterns comprises accessing a cause-effect pattern database, and wherein the cause-effect pattern database is generated by a method comprising:

recognizing eSAO sets in a corpus of text documents;

generating a corpus of sentences, wherein each sentence contains at least one of the recognized eSAO sets;

recognizing particular cases of cause-effect relations in the sentences;

generalizing the particular cases of cause-effect relations to eSAO cause-effect patterns;

storing the eSAO cause-effect patterns in a cause-effect pattern database.

6. The method according to claim 1, wherein recognizing the first expanded Subject-Action-Object (eSAO) set in the text comprises accessing a linguistic knowledge base having a database defining eSAO components.

7. The computer implemented method of claim 1, wherein the two or more eSAO components in the text grouped together to form the first semantic unit are three or more eSAO components that include a subject component, an action component, and an object component, and matching the first eSAO set and the second eSAO set against cause-effect (C-E) relationship patterns stored in the memory includes identifying a cause-effect relationship pattern using the action component of the first eSAO set.

8. The semantic processor of claim 1, wherein the first eSAO set includes four or more eSAO components in the text grouped together to form the first semantic unit.

9. The semantic processor of claim 8, wherein the second eSAO set includes four or more eSAO components in the text grouped together to form the second semantic unit.

10. A computer-readable medium having computer-executable instructions for performing a method for recognizing cause-effect relations in natural language documents to generate a cause-effect knowledge base, the method comprising:

providing text from at least one natural language document;

recognizing a first expanded Subject-Action-Object (eSAO) set that includes two or more eSAO components in the text grouped together to form a first semantic unit;

recognizing a second eSAO set in the text that includes two or more eSAO components in the text grouped together to form a second semantic unit, the two or more eSAO components grouped together to form the second semantic unit being different from the two or more eSAO components grouped together to form the first semantic unit;

matching the first and second eSAO sets against cause-effect (C-E) relationship patterns stored in a memory, wherein the C-E relationship patterns include indicators of a presence of a C-E relation in a sentence and information about an eSAO set in the text that acts as a cause part of the C-E relation and an eSAO set in the text acts as an effect part of the C-E relation;

generating one or more eSAO cause-effect relations based on the matching, wherein each eSAO cause-effect relation identifies one of the first eSAO set and the second eSAO set as a cause eSAO and the other of the first eSAO set and the second eSAO set as an effect eSAO; and storing the one or more eSAO cause-effect relations in a knowledge base.

11. The computer implemented method of claim 10, wherein the cause-effect (C-E) relationship patterns stored in a memory include at least of one of the following patterns:

A.) adverbial modifier of purpose TO VB|DO|HV pattern;
B.) adverbial modifier of cause BY VBG pattern;
C.) adverbial modifier of purpose FOR VBG pattern;
D.) adverbial modifier of purpose THUS VGB pattern;
E.) subject in the form of a participle phrase pattern;
F.) adverbial modifier of cause DEPEND ON pattern;
G.) complex sentence CONDUCTION CAUSE pattern; and
H.) complex sentence CONJUNCTION EFFECT pattern.

12. A semantic processor comprising computer hardware that executes logic to recognize cause-effect relations in text in electronic or digital form the processor comprising:

a linguistic knowledge base stored in at least one storage media; and a semantic analyzer comprising:

an expanded subject-action-object (eSAO) recognizer configured to recognize a first eSAO set and a second eSAO set in the text, the first eSAO set including two or more eSAO components and the second eSAO set including two or more eSAO components that are different than the two or more eSAO components of the first eSAO set, the first and second eSAO sets being based on eSAO definitions stored in the linguistic knowledge base; and a cause-effect recognizer configured to match the first and second eSAO sets with known cause-effect relationship patterns stored in the linguistic knowledge base, the known cause-effect relationship patterns including indicators of a presence of a cause-effect relation in a sentence and information about an eSAO set in the sentence that acts as a cause part of the C-E relation and an eSAO set in the sentence that acts as an effect part of the cause-effect relation, and to produce one or more eSAO cause-effect relations based on the match, wherein the produced cause-effect relations each identify one of the first eSAO set and the second eSAO set as a cause eSAO and the other of the first eSAO set and the second eSAO set as an effect eSAO.

13. The semantic processor according to claim 12, wherein the semantic processor comprises a linguistic analyzer that includes:
- a parts-of speech tagger for receiving preformatted text based on the text in electronic or digital format; and
- a parser for receiving the text tagged by the parts-of-speech tagger and providing parsed text to the semantic analyzer,
- wherein the parts-of-speech tagger and the parser operate with data stored in the linguistic knowledge base.

14. The semantic processor according to claim 13, further comprising:
- a preformatter for receiving the text in electronic or digital format and producing preformatted text based on data stored in the linguistic knowledge base; and
- a knowledge base generator for producing a knowledge base from the one or more eSAO cause-effect relations generated by the linguistic analyzer.

15. The semantic processor according to claim 14, wherein the preformatter performs at least one of the following functions:
- removal of any symbols in a digital or electronic representation of the text that do not form part of natural language text;
- detection and correction of any mismatches or mistakes in the text; and
- partitioning the text into structures of sentences and words.

16. The semantic processor according to claim 12, wherein the known cause-effect relationship patterns are created by a cause-effect relationship generator comprising:
- a corpus linguistic analyzer for recognizing eSAO sets in a corpus of text documents;
- a corpus eSAO generator for generating a corpus of sentences, wherein each sentence contains at least one of the recognized eSAO sets;
- a relation recognizer for recognizing particular cases of cause-effect relations in the sentences;
- a pattern generator for generalizing the particular cases of cause-effect relations to eSAO cause-effect patterns; and
- a pattern tester for storing the eSAO cause-effect patterns in a cause-effect pattern database, wherein the cause-effect pattern database is a database within the linguistic knowledge base.

17. The semantic processor according to claim 12, wherein the eSAO cause-effect relation comprises a cause eSAO, an effect eSAO, and at least one sequential operator relating the cause eSAO to the effect eSAO.

18. The semantic processor according to claim 17, wherein the cause eSAO comprises one or more eSAO components and the effect eSAO comprises one or more eSAO components different than the one or more eSAO components of the cause eSAO.

19. The semantic processor according to claim 18, wherein the eSAO components of the cause eSAO and the effect eSAO each comprise text related to one or more elements of the group consisting of: subjects, objects, actions, adjectives, prepositions, indirect objects, and adverbs.

20. The semantic processor of claim 12, wherein the cause-effect recognizer is adapted to compare the first and second eSAO sets against all of the following cause-effect relationship patterns:
- A.) actions with a cause sense pattern, in which an action field of the pattern has a cause sense, a subject field of the pattern has a cause label, and an object field of the pattern has an effect label;
- B.) actions with a result from sense pattern, in which an action field of the pattern has a result from sense, a subject field of the pattern has an effect label, and an object field of the pattern has a cause label;
- C.) cause of construction in object pattern, in which an object field of the pattern has a cause of sense and an effect label, the action field of the pattern has a be sense, and a subject field of the pattern has a cause label;
- D.) cause of construction in subject pattern, in which a subject field of the pattern has a cause of sense and an effect label, the action field of the pattern has a be sense, and an object field of the pattern has a cause label;
- E.) actions with technical sense pattern, in which an action field of the pattern has a technical action sense and an effect label and a subject field of the pattern has a cause field;
- F.) a first process noun in object pattern, in which the object has a process noun or PROCESS_NN sense and an effect label, an action field of the pattern has a LINK ACTION_sense, and a subject field of the pattern has a cause label; and
- G.) a second process noun in object pattern, in which the object has a process noun or PROCESS_NN sense, an action field of the pattern has a LINK_TECH _ACTION sense and an effect label, and a subject field of the pattern has a cause label.

21. The semantic processor of claim 12, wherein the first eSAO set includes three or more eSAO components in the text grouped together to form the distinct semantic units.

22. The semantic processor of claim 12, wherein the first eSAO set includes four or more eSAO components in the text grouped together to form the distinct semantic units.

23. A semantic processor comprising computer hardware that executes logic to recognize cause-effect relations in text in electronic or digital form the processor comprising:
- a linguistic knowledge base stored in at least one storage media; and
- a semantic analyzer comprising:
  - an expanded subject-action-object (eSAO) recognizer that produces one or more eSAO sets based on the text, wherein the eSAO sets are based on eSAO definitions stored in the linguistic knowledge base and wherein each eSAO set includes three or more eSAO components in the text; and
  - a cause-effect recognizer that matches the one or more eSAO sets with known cause-effect relationship patterns stored in the linguistic knowledge base and produces one or more eSAO cause-effect relations based on the match, wherein the cause-effect relations each include indicators of a presence of a cause-effect relation in a sentence and information about which eSAO components or whole eSAOs in the sentence act as a cause part of the cause-effect relation and which eSAO components or whole eSAOs in the sentence act as an effect part of the cause-effect relation,
- wherein the cause-effect (C-E) relationship patterns stored in a memory include at least of one of the following patterns:
- A.) actions with cause sense pattern, in which an action field of the pattern has a cause sense, a subject field of the pattern has a cause label, and an object field of the pattern has an effect label;
- B.) actions with result from sense pattern, in which an action field of the pattern has a result from sense, a subject field of the pattern has an effect label, and an object field of the pattern has a cause label;

C.) cause of construction in object pattern, in which an object field of the pattern has a cause of sense and an effect label, the action field of the pattern has a be sense, and a subject field of the pattern has a cause label;
D.) cause of construction in subject pattern, in which a subject field of the pattern has a cause of sense and an effect label, the action field of the pattern has a be sense, and an object field of the pattern has a cause label;
E.) actions with technical sense pattern, in which an action field of the pattern has a technical action sense and an effect label and a subject field of the pattern has a cause label;
F.) a first process noun in object pattern, in which the object has a process noun or PROCESS_NN sense and an effect label, an action field of the pattern has a LINK_ACTION sense, and a subject field of the pattern has a cause label; and
G.) a second process noun in object pattern, in which the object has a process noun or PROCESS_NN sense, an action field of the pattern has a LINK_TECH_ACTION sense and an effect label, and a subject field of the pattern has a cause label.

* * * * *

UNITED STATES PATENT AND TRADEMARK OFFICE
CERTIFICATE OF CORRECTION

| | | |
|---|---|---|
| PATENT NO. | : 9,009,590 B2 | Page 1 of 1 |
| APPLICATION NO. | : 11/258250 | |
| DATED | : April 14, 2015 | |
| INVENTOR(S) | : Todhunter et al. | |

It is certified that error appears in the above-identified patent and that said Letters Patent is hereby corrected as shown below:

IN THE CLAIMS SECTION

COLUMN 26, lines 20 and 21, the term "LINK ACTION_sense" should read --LINK_ACTION sense--

Signed and Sealed this
Twenty-fourth Day of November, 2015

Michelle K. Lee
*Director of the United States Patent and Trademark Office*